US005896291A

United States Patent [19]

Hewitt et al.

[11] Patent Number: 5,896,291

[45] Date of Patent: Apr. 20, 1999

[54] COMPUTER SYSTEM AND METHOD FOR IMPLEMENTING DELAY-BASED EFFECTS USING SYSTEM MEMORY

[75] Inventors: Larry Hewitt; David Suggs; David Norris, all of Travis County, Tex.

[73] Assignee: Advanced Micro Devices, Inc., Sunnyvale, Calif.

[21] Appl. No.: 08/770,012

[22] Filed: Dec. 19, 1996

[51] Int. Cl.[6] .......... G06F 17/00

[52] U.S. Cl. .......... 364/400.01; 381/61; 381/62; 381/63

[58] Field of Search .......... 381/1, 61, 63, 381/66, 62; 84/604–607, 621–628; 364/400.01; 395/280–282, 306, 308–309, 800; 704/500–504

[56] References Cited

U.S. PATENT DOCUMENTS

| | | | |
|---|---|---|---|
| 5,486,644 | 1/1996 | Kudo et al. . | |
| 5,530,762 | 6/1996 | Jones et al. | 381/63 |
| 5,539,145 | 7/1996 | Kuribayashi et al. . | |
| 5,553,011 | 9/1996 | Fujita . | |
| 5,642,422 | 6/1997 | Hon et al. | 381/1 |
| 5,689,080 | 11/1997 | Gulick | 84/604 |

*Primary Examiner*—Paul Loomis
*Assistant Examiner*—Duc Nguyen
*Attorney, Agent, or Firm*—Conley, Rose & Tayon

[57] ABSTRACT

A system and method is provided for performing sound synthesis with delay-based special effects which may be algorithmically implemented using one or more time-delay elements The system implements the time-delay elements by using system memory to store time-delay data. The system and method described herein utilizes the benefits of a high bandwidth I/O bus while mitigating the disadvantages introduced by having to arbitrate for a shared system bus. By using system memory for storing time-delay data, a more cost effective PC audio system can be produced.

20 Claims, 6 Drawing Sheets

COMPUTER SYSTEM AND METHOD FOR IMPLEMENTING DELAY-BASED EFFECTS USING SYSTEM MEMORY

BACKGROUND OF THE INVENTION

1. Field of the Invention

This invention is related to the field of computer systems which perform sound synthesis and, more particularly, to a computer system which generates delay-based sound effects by using system memory to perform the function of a delay element.

2. Description of the Relevant Art

Personal computer (PC) audio systems have traditionally employed a technique called Frequency Modulation (FM) synthesis to generate audio sounds. FM synthesis works by combining the outputs of multiple sine wave oscillators which are relatively close in frequency to produce complex sound waves with close-to-natural timbres, attacks and delays. An advantage of FM synthesis is that it is relatively inexpensive to implement. A disadvantage is that FM synthesized sounds are generally recognizable as synthesized sounds.

A new music synthesis method, wavetable music synthesis, has the advantage of producing more life-like sounds than FM synthesis. Wavetable music synthesizers store digitally sampled audio data in digital memory. Thus, in wavetable synthesis, samples of actual audio are used to create sounds, as opposed to synthesizing sine waves in FM synthesis. Typically, wavetable synthesizers do not store a sample of each note which the instrument is capable of playing. Rather, to minimize the memory requirement, wavetable synthesizers typically store samples of a few representative notes of the instrument For example, a wavetable music synthesizer might store eight of the eighty-eight possible notes of a piano. Wavetable synthesizers then retrieve one of these stored data samples, shift the pitch of the sampled data to the desired new pitch, and then perform digital-to-analog conversion on the new data so that an analog device such as a speaker or headphone can reproduce the original sound. Often many audio sources, also known as voices, are sampled and stored in memory. Examples of such voices are musical instruments and human voices. A collection of samples of one or more voices is commonly referred to as wavetable data.

The quality of the music generated in either of the manners described above can often be improved when some of the voices are processed with delay-based audio effects. Examples of delay-based audio effects are echo, reverb, chorus, and flange. The echo effect imitates the delayed version of a sound that results from reflection from a large object. The reverb effect imitates the many delayed and distorted versions of a sound that result from many echoes bouncing back and forth in a small enclosed space of high acoustic reflectivity. The chorus effect imitates the not-quite-simultaneous repeated versions of a sound that results from many sound sources acting in concert. The flange effect imitates the slow decay of a sound that results from a sound propagating in multiple paths from the source to the listener.

To create these effects it is necessary to provide a method for producing delayed versions of the audio output. The conventional method for doing this is to store the audio samples in a queue in memory. The queue then functions as a time-delay element to provide a time-delay data stream.

The cost of having a dedicated memory to store time-delayed data samples could be eliminated by using the personal computer's system memory to store time-delay data. Applicant is aware of various unified memory architectures which attempt to store video data in the main or system memory. The following U.S. Patent applications disclose a system for using system memory for storing wavetable data:

U.S. patent application Ser. No. 08/621,397, filed Mar. 25, 1996, and titled "Computer system and method for performing wavetable music synthesis which stores wavetable data in system memory"

U.S. patent application Ser. No. 08/623,850, filed Mar. 25, 1996, and titled "Computer system and method for generating delay based audio effects in a wavetable music synthesizer which stores wavetable data in system memory"

U.S. patent application Ser. No. 08/622,471, filed Mar. 25, 1996, and titled "Computer system and method for performing wavetable music synthesis which stores wavetable data in system memory employing a high priority I/O bus request mechanism for improved audio fidelity"

U.S. patent application Ser. No. 08/622,761, filed Mar. 25, 1996, and titled "Computer system and method for performing wavetable music synthesis which stores wavetable data in system memory which minimizes audio infidelity due to wavetable data access latency"

This approach has generally had performance penalties, however, because of bandwidth and bus mastering issues associated with the system bus.

In the past, personal Computer system I/O buses have not provided enough bandwidth for a unified memory architecture implementation. A typical Industry Standard Architecture (ISA) bus implementation, for example, is only capable of sustaining a bandwidth of a few megabytes per second. With the advent of the Peripheral Component Interconnect (PCI) bus, this problem has been substantially reduced in that PCI bus implementations are capable of sustaining on the order of 100 MB/second.

The PCI bus, however, introduces some additional problems. Specifically, PCI is tied very closely with the PC's CPU. As a result the PCI bus has been optimized around the burst nature of refilling the CPU's cache memory. Further, the latency involved in gaining control of the PCI bus once a request for bus mastership is generated is both significant and indeterminate. PCI bus master latency is typically 2–3 microseconds, often 20–30 microseconds, and delays as long as 100–200 microseconds are possible. Thus the PCI bus is not ideal for isochronous or real-time transfers.

A typical sound DSP can have multiple voices active simultaneously. The number of simultaneous active voices is referred to as the polyphony of the DSP. A sound DSP operates as a Digital Signal Processor (DSP) system, and as such has an associated sample rate hereinafter called the frame rate, which we will assume is 44,100 frames per second. During each frame time, which is the reciprocal of the frame rate (22.7 microseconds at a frame rate of 44,100 frames per second), the DSP must calculate a new output value for each of the active voices (up to 32 in our example). Assuming the polyphony is 32, this implies that the DSP hardware must process up to 44,100×32=1,411,200 voice outputs per second. The data samples are typically one byte or two bytes wide.

When performing digital-to-analog (D/A) conversion on sampled audio data, the data samples are supplied to a D/A converter. Each data sample has an associated arithmetic value which is supplied to the D/A converter. A ramp rate, or slope, exists between the arithmetic values of any two consecutive samples Audible artifacts, such as a "pop" from the speaker or other audio output device, are heard in the reproduced sound if two consecutive samples of audio data are supplied to the D/A converter which have a slope beyond a maximum value. These audible artifacts are commonly referred to as "zipper noise".

When D/A converters are not supplied with a sample value at their clock edge, i.e., not supplied at the required sample rate, in this case at or above the Nyquist frequency, the D/A converter can interpret the value as either the minimum or maximum arithmetic value receivable by the D/A converter. Hence, if samples are not supplied to an audio D/A converter on time there exists a high probability of creating unwanted pops and clicks.

SUMMARY OF THE INVENTION

The present invention comprises a system and method for performing sound synthesis with delay-based special effects which may be algorithmically implemented using one or more time-delay elements. The system implements the time-delay elements by using system memory to store time-delay data. The system and method described herein utilizes the benefits of a high bandwidth I/O bus while mitigating the disadvantages introduced by having to arbitrate for a shared system bus. By using system memory for storing time-delay data, a more cost effective PC audio system can be produced.

In the preferred embodiment a computer system is provided that includes a system memory, which has as one of its functions to store time-delay data samples, a PCI bus, and a PCI-based audio synthesis device. The audio synthesis device includes a PCI bus interface, a DSP, and a plurality of buffers coupled to the PCI bus interface and the DSP. The audio synthesis device comprises registers that specify the start and physical addresses in system memory for each queue as well as registers which specify read and write addresses. The PCI bus interface is a PCI master controller which accomplishes the transfer of data between the system memory and the buffers.

The buffers receive time-delay data samples from system memory. Each buffer has a characteristic sample depth. In a horizontal cache embodiment, the number of buffers defines the number of time-delay elements needed for a delay-based special effect, and each active buffer corresponds to an active time-delay element. In a vertical cache embodiment, a small fixed number of buffers are used. The buffer sizes are preferably small to minimize the size of the integrated circuit die area, and thus the cost of the integrated circuit due to increased yield. Conversely, the buffer sizes are also preferably sufficiently large to minimize the rate of PCI bus mastership requests and to maximize the allowed latency of obtaining PCI bus mastership.

The audio synthesis device also includes a buffer manager which controls the operation of the buffers. Additionally, the audio synthesis device includes a plurality of write-back buffers coupled to the PCI bus interface, the buffer manager, and the DSP, for effects processing. The DSP is operable to read a plurality of time-delay data samples from one location in system memory through the plurality of buffers and write a plurality of time-delay data samples back to a different location in system memory through the plurality of write-back buffers.

Broadly speaking the present invention contemplates a computer system and method for performing sound synthesis with delay-based special effects, comprising a system memory which stores time-delay data, an I/O bus coupled to the system memory, and a system audio device. The system audio device comprises an I/O bus interface coupled to the I/O bus, a DSP which generates control signals comprising address signals to request the time-delay data in order to generate sound effects, and a plurality of buffers coupled to the I/O bus interface and to the DSP data path for buffering the time-delay data from the system memory. Each of the plurality of buffers has a sample depth for storing a plurality of time-delay data samples, wherein the sample depth is predetermined to minimize total I/O bus mastership requests and maximize allowed I/O bus mastership latency. The system audio device further-comprises a buffer manager coupled to the I/O bus interface, the DSP address generator, and the plurality of buffers, for managing transfers of the time-delay data from the system memory to the buffers to the DSP data path in response to the control signals from the DSP for the time-delay data. The DSP address generator generates a request for a new time-delay data sample, wherein the buffer manager determines if the new time-delay data sample resides in the plurality of buffers, wherein the buffer manager controls the plurality of buffers to output the new time-delay data sample if the new time-delay data sample resides in the plurality of buffers, wherein the buffer manager controls the I/O bus interface to fetch the new time-delay data sample from the system memory if the new time-delay data sample does not reside in the plurality of buffers.

BRIEF DESCRIPTION OF THE DRAWINGS

Other objects and advantages of the invention will become apparent upon reading the following detailed description and upon reference to the accompanying drawings in which.

Figure 1:
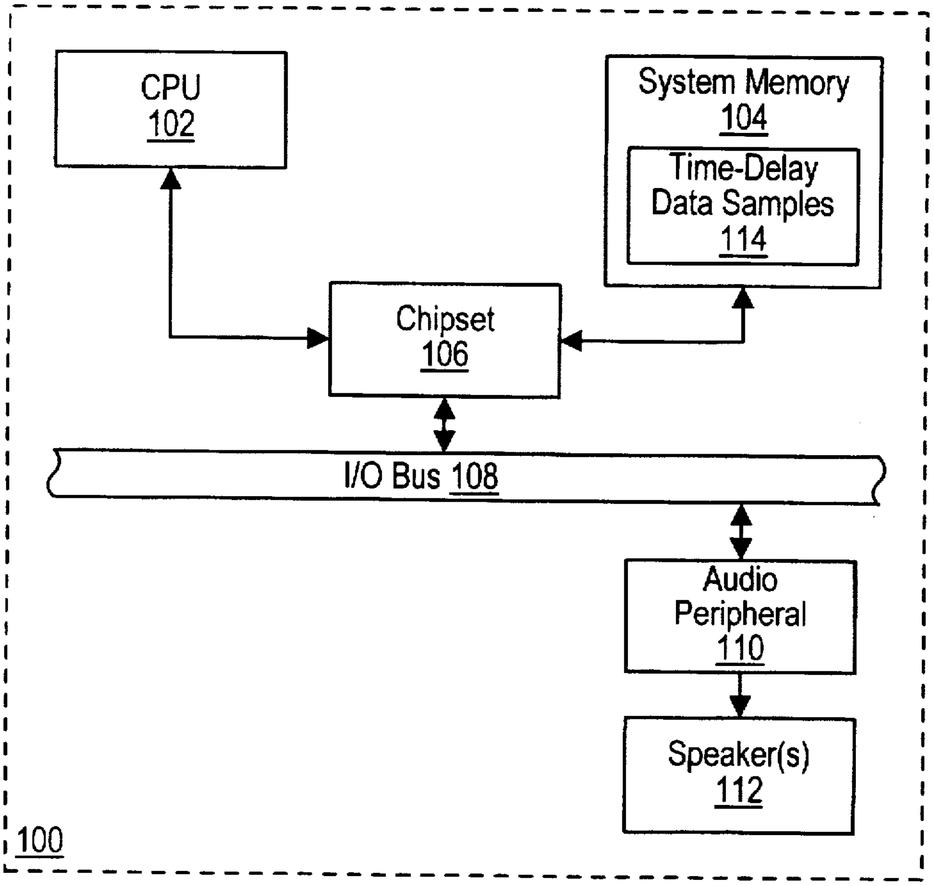
FIG. 1 is a block diagram of a computer system having an audio card which performs sound synthesis with delay-based special effects.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF THE PREFERRED EMBODIMENT

Turning now to FIG. 1, one embodiment of a computer system 100 according to the present invention is shown. The computer system 100 includes a CPU 102, a system memory 104, a chipset 106, and a system audio device 110. Chipset 106 and audio device 110 are coupled to an I/O bus 108. Audio device 110 generates sound through an analog device 112 such as speakers or headphones. According to the present invention, the system memory 104 stores time-delay data used by the audio device 110. The audio device 110 employs time-delay data 114 contained in system memory 104 to create delay-based special effects. Thus, the cost of a dedicated memory for storing time-delay data is eliminated, thereby reducing the total cost of the system. However, storing time-delay data 114 in system memory rather than a dedicated memory introduces bandwidth problems with the I/O bus 108. The I/O bus 108 is a shared resource which is used by other components in the system, such as CPU 102, and other peripheral devices connected to the I/O bus 108. These devices must arbitrate for the I/O bus 108. This arbitration introduces a latency associated with fetching time-delay data samples. The present invention solves this problem as will be discussed shortly.

In one embodiment the chipset 106 includes an I/O bus arbiter which performs arbitration for the I/O bus 108 between the system audio device 110 and other peripheral devices (not shown). The I/O bus arbiter accommodates normal priority I/O bus requests and high priority I/O bus requests. The high priority I/O bus request mechanism enables devices to obtain mastership of the I/O bus 108 sooner than would normally be possible. By obtaining mastership of the I/O bus 108 sooner, the requesting device may obtain or supply time-critical data.

I/O bus 108 provides a sufficient bandwidth for samples of time-delay data 114 to be fetched at a rate to synthesize special effects using a characteristic number of delay elements at a characteristic frame rate. For the reverb sound effect, the number of delay elements is 11 and the frame rate is 44,100 samples per second. In the reverb sound effect, the audio device requires 14 samples of time-delay data per frame time and writes 11 samples of time delay data per frame time. In the preferred embodiment the width of a sample is 16 bits. Hence, in the preferred embodiment I/O bus 108 must be capable of sustaining 1,102,500 samples or 2,205,000 bytes per second of time-delay data transfer from system memory 104 to audio device 110 without significant impact on the performance of the PC system as a whole. In one embodiment, chipset 106 is the Triton Chipset made by Intel Corporation which is capable of sustaining data transfer rates in excess of 80 MB/sec.

Figure 2:
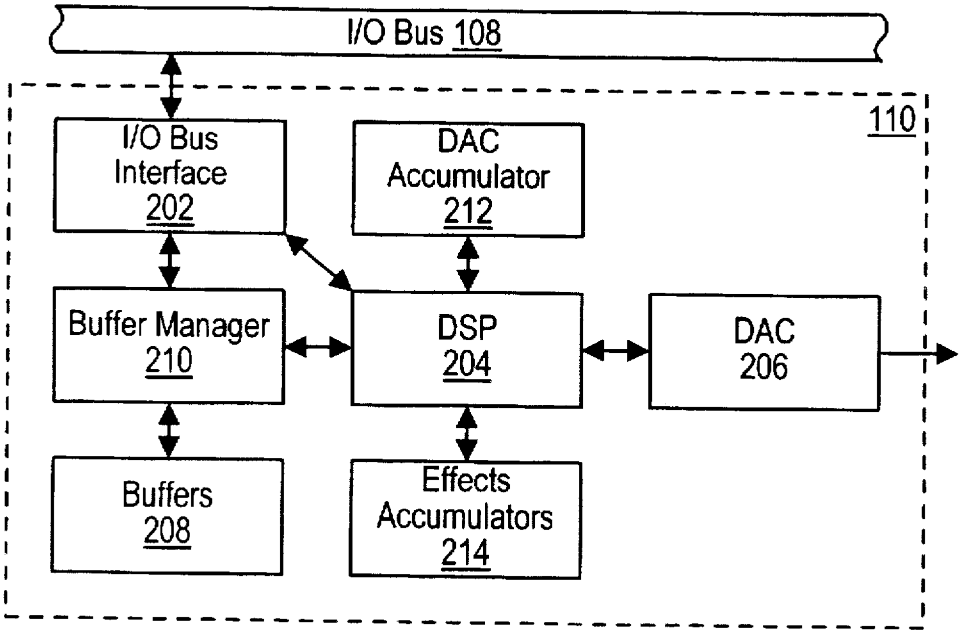
FIG. 2 is a block diagram of a computer system having a system audio device which performs sound synthesis with delay-based special effects via time-delay data stored in the system memory.

Turning now to FIG. 2, a block diagram of the preferred embodiment of audio device 110 of FIG. 2 is shown. Audio device 110 includes an I/O bus interface 202, a DSP 204, a digital-to-analog converter (DAC) 206, a plurality of buffers 208 and a buffer manager 210. Additionally, DSP 204 can access a DAC accumulator 212 and one or more effects accumulators 214. In a horizontal cache embodiment, the number of buffers 208 is equal to the number of delay elements which may be active simultaneously; i.e., each of buffers 208 corresponds to a delay element. In the preferred embodiment this number is 11.

DSP 204 generates a request for a time-delay data sample for each delay element each frame. Typically, DSP 204 generates requests for samples sequentially. In the preferred embodiment data samples for a given delay element are stored sequentially in system memory 104. Hence, buffer manager 210 advantageously prefetches time-delay data samples for active time delay elements into buffers 208 in anticipation of sequential requests from DSP 204. In other words, buffer manager 210 fills buffers 208 in a predetermined fashion in order to avoid I/O bus latencies associated with fetching the samples. In the preferred embodiment, the depth of each of buffers 208 is 16 and buffer manager 210 prefetches the number of samples of data required to fill the buffers for each delay element when the first buffer uses its eighth sample; i.e. when only 8 samples remain in the respective buffer. If DSP 204 does not receive the requested data sample before it is needed, DSP 204 outputs a surrogate value to DAC 206 until the new data sample becomes available. Hence, buffers 208 minimize the impact of conditions where I/O bus latencies are large.

The surrogate value is advantageously calculated so as to avoid introducing zipper noise. In the preferred embodiment, the surrogate value, and subsequent values, are the last value calculated by the DSP. Since the slope between two consecutive samples of equal value is zero, the slope does not exceed the maximum slope beyond which zipper noise is introduced.

In an alternate embodiment, the DSP calculates the surrogate value, and subsequent surrogate values, by ramping toward zero at the fastest rate which does not produce audible artifacts, i.e., zipper noise. If data samples are not available for a prolonged period of time, the surrogate value eventually becomes zero.

I/O bus interface 202 arbitrates for, gains mastership of, and fetches time-delay data samples across I/O bus 108 into buffers 208 in response to requests from buffer manager 210. In the preferred embodiment buffer manager 210 attempts to fill buffers 108 for all active delay elements in a given I/O bus 108 mastership, and thus minimizes the number of I/O bus 108 mastership requests per second and improves overall system performance. Accordingly, as can readily be observed, the greater the number of samples which can be prefetched into buffers 208 the fewer the number of I/O bus 108 mastership requests per second which audio device 110 must make. However, it should be noted that increasing the depth of buffers 208 increases the die size of the integrated circuit embodying audio device 110 and thus increases its cost.

When buffer manager 210 receives a request for time-delay data samples from DSP 204 it determines whether the requested samples reside in buffers 208. If so, buffer manager 210 passes the requested samples from buffers 208 to DSP 204. If buffer manager 210 determines that the samples requested by DSP 204 do not reside in buffers 208, buffer manager 210 asserts high priority fill request signal, i.e., generates a high priority fill request. In response to this assertion, I/O bus interface 202 generates a high priority I/O bus request and obtains mastership of I/O bus 108. Once I/O bus interface 202 obtains mastership of I/O bus 108 buffer manager 210 fills the buffer in buffers 208 corresponding to the delay element associated with the high priority request with time-delay data samples from system memory. These samples are specified by address signals which are passed to I/O bus 108 by I/O bus interface 202. The samples are transferred from system memory on I/O bus 108, through I/O bus interface 202, and routed by buffer manager 210 into buffers 208.

In the event that I/O bus interface 202 is unable to obtain mastership of I/O bus 108 within a desired frame time latency, buffer manager 210 asserts data unavailable signal to notify DSP 204 that the requested data sample was unavailable. If DSP 204 does not receive the requested data sample within the desired frame time the DSP outputs a surrogate value, as previously described, until the new data sample becomes available.

As mentioned previously, buffer manager 210 prefetches time-delay data samples in a sequential fashion. When buffer manager 210 determines such a fill request, denoted as a normal fill request, of buffers 208 is required, buffer manager 210 asserts a normal fill request signal. In response to this assertion, I/O bus interface 202 arbitrates for and obtains mastership of I/O bus 108. Once I/O bus interface 202 obtains mastership of I/O bus 108 buffer manager 210 fills all of buffers 208 which correspond to active delay elements. In the event that a high priority fill request and a normal fill request are simultaneously pending when I/O bus interface 108 obtains bus mastership buffer manager 210 performs a fill associated with the high priority fill request before performing a fill associated with the normal fill request.

In the preferred embodiment I/O bus 108 is the PCI bus. As of revision 2.1 of the PCI specification, no provision exists for a high priority bus mastership request. However, it is noted that such a capability could be added to the specification in the future. It is further noted that the present invention is susceptible to implementations with other I/O buses, including future buses, which may in fact implement a high priority bus mastership request capability In such a case, the invention described herein would advantageously employ such a capability.

Figure 3:
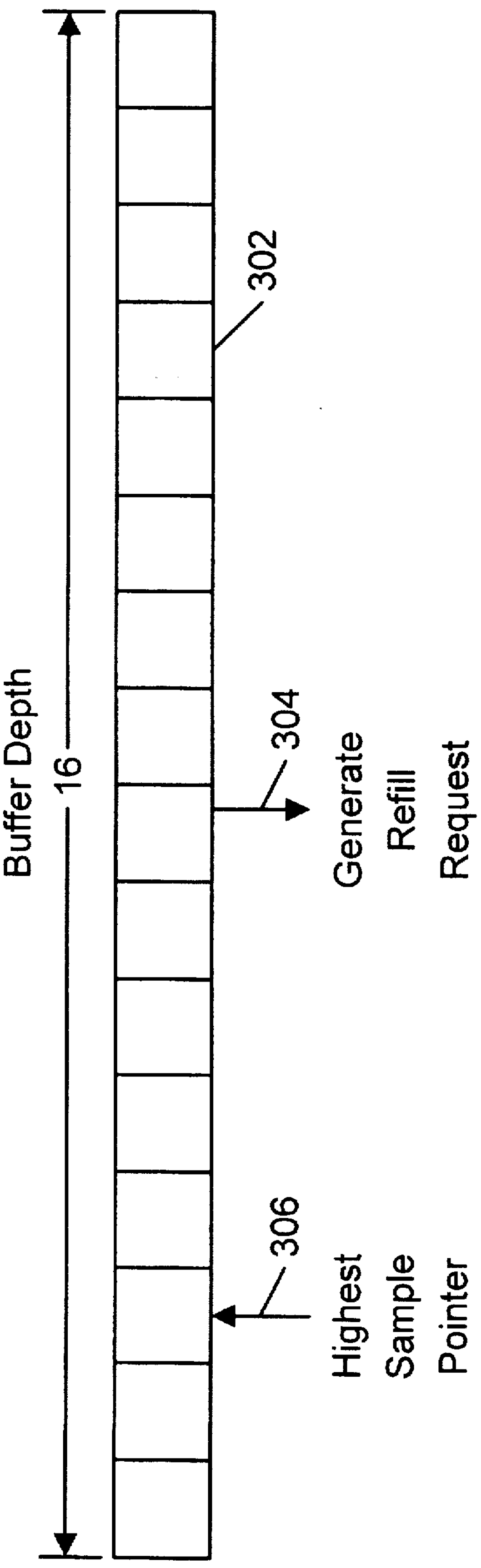
FIG. 3 is a schematic diagram of a read buffer configuration which may be used for read caching of system memory data.

Turning now to FIG. 3, an illustration of a buffer 302 is shown. Buffer 302 is exemplary of plurality of buffers 208 in FIG. 2. In the embodiment-shown, buffer 302 has a depth of 16, i.e., has 16 sample locations. Buffer manager 210 maintains a highest sample pointer 306 which points to the next available sample in buffer 302. Each time buffer 302 passes a new (higher numbered) sample to DSP 204, buffer manager 210 updates highest sample pointer 306 to point to the next available sample. When highest sample pointer 306 points to a predetermined generate fill request location 304, buffer manager 210 asserts the normal fill request signal. In the preferred embodiment, generate fill request location 304 is where 8 samples remain in buffer 302. It is noted that various depths of buffer 302 and generate fill request location 304 may be realized and in describing the embodiment shown it is not the intention to preclude any such other variations.

Figure 4:
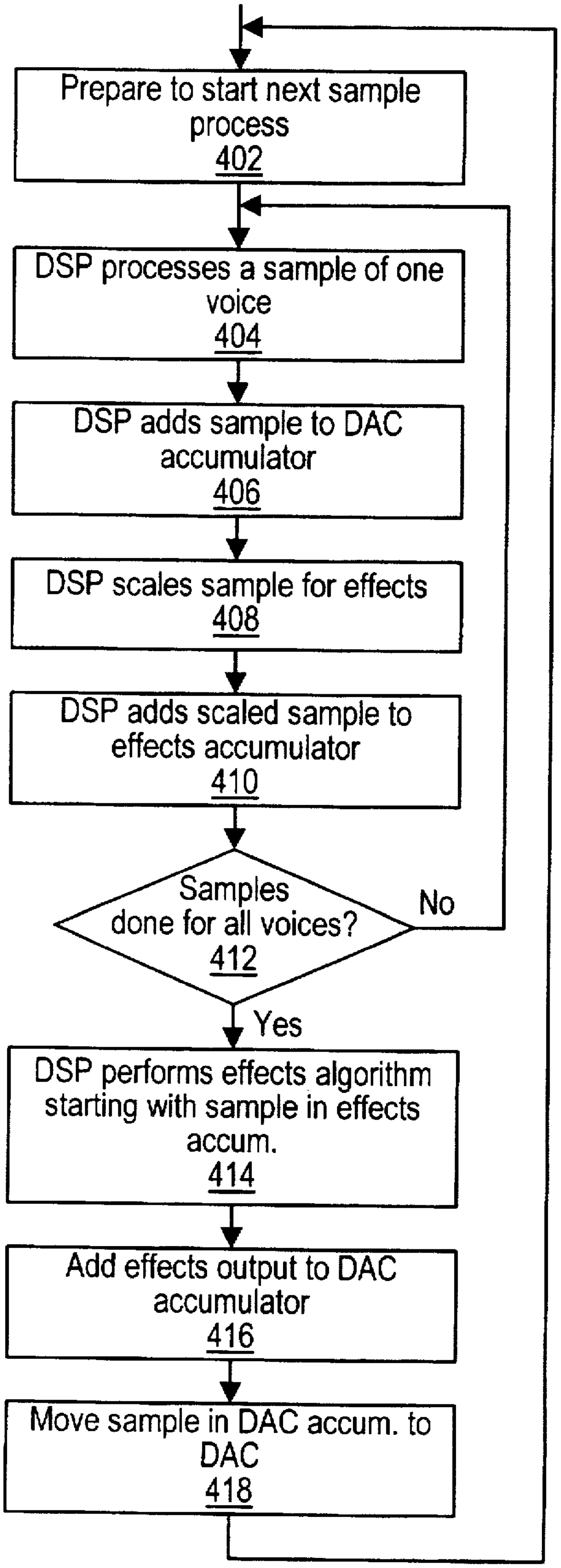
FIG. 4 is a flowchart illustrating some of the steps which the system audio device takes in performing sound synthesis.

Turning now to FIG. 4, a flowchart illustrating steps which the DSP takes in performing sound synthesis with delay-based special effects is shown. During normal operation, the DSP executes an initialization step 302 which resets counters and clears accumulators 212 and 214. The DSP then enters a loop which is executed once for each active voice. The first step executed in the loop by the DSP is step 304, the determination of a current sample for the current voice at the current time interval. In step 306, the DSP adds the current sample to the contents DAC accumulator 212. The DSP then (in step 308) scales the current sample according to the desired contribution from the current voice to the special effect. In step 310, the scaled sample is added to the contents of one or more effects accumulators 214. In a decision step 312 the DSP then determines if all the active voices have been processed, and if not, the DSP returns to step 304 to determine a sample for the next voice. Otherwise, the DSP then executes a special effects algorithm in step 314 using the contents of the effects accumulators in the determination of a special effects sample. In step 316 the DSP adds the special effects sample to the contents of the DAC accumulator, and in step 318 the DSP passes the DAC accumulator contents to DAC 206 for output to speaker 112. The DSP then returns to step 302 to repeat the entire process for the next time instant.

Figure 7:
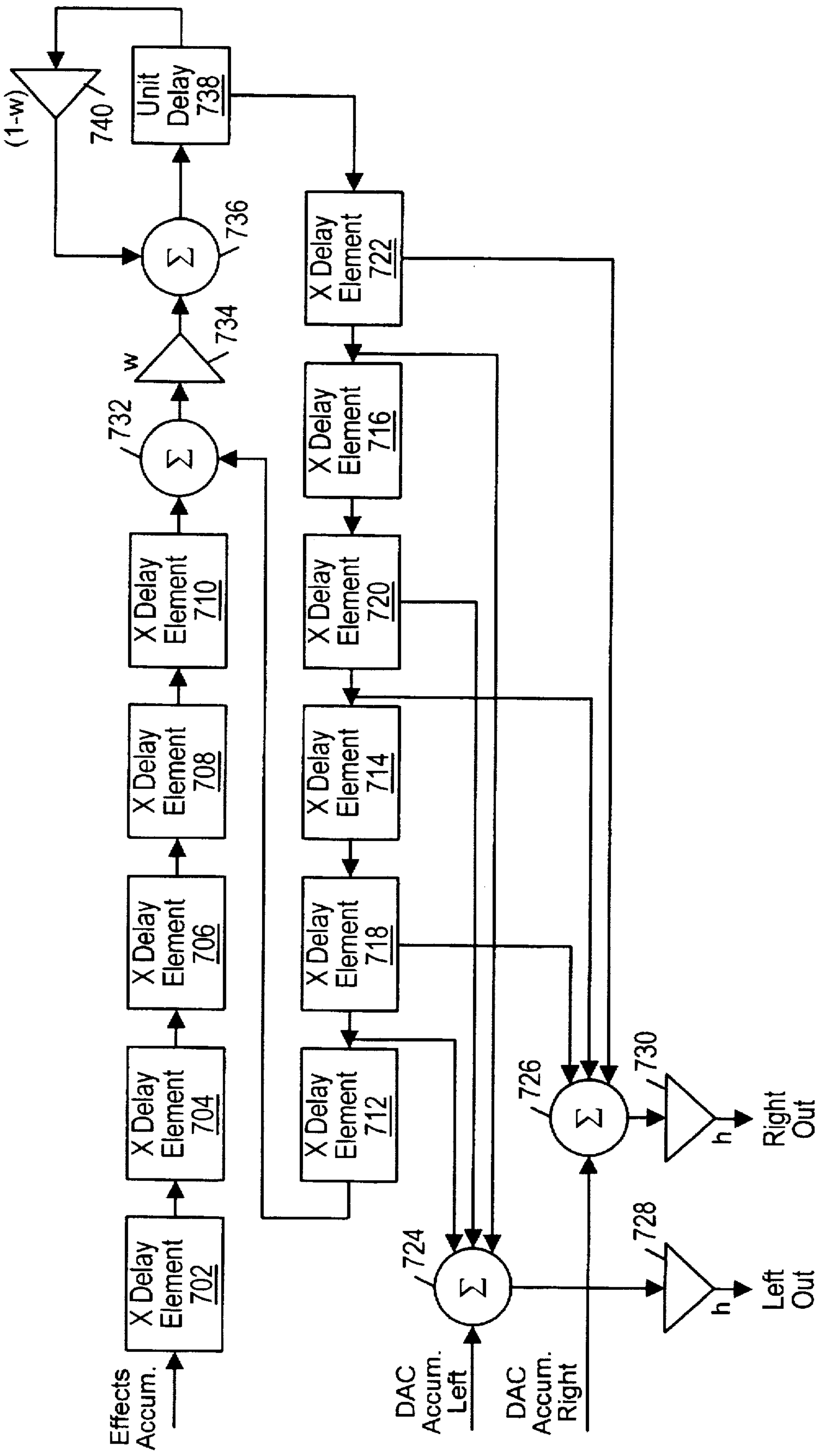

As will be discussed further below, FIG. 7 is a signal flow diagram which illustrates an algorithm for reverb, a delay-based special effect. The algorithm includes the use of eleven delay elements, eight of which are of a variety X and three of which are a variety Y.

Figure 5:
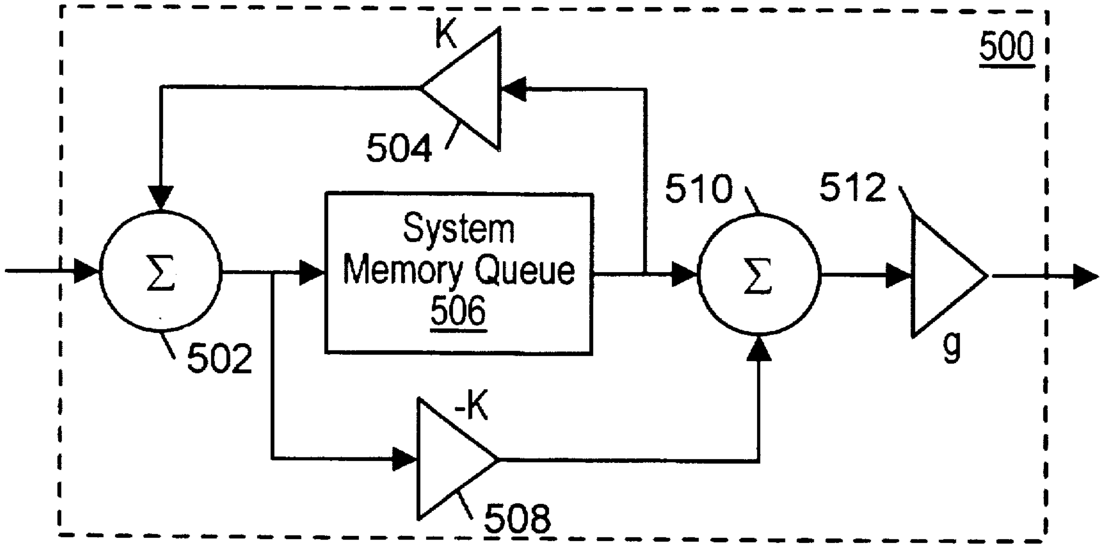
FIG. 5 is a signal flow diagram illustrating the algorithm used to generate reverb, a delay-based special effect.

Turning now to FIG. 5, a signal flow diagram is provided which illustrates the operation of an X delay element 500. The intent of an X delay element is to produce an effect similar to repeated acoustic reflection between a pair of parallel surfaces. A buffer 504 obtains a sample value from the output of a system memory queue 506, multiplies it by a constant value K, and forwards the result to a summer 502. Summer 502 adds the result to the input to X delay element 500, and stores the sum in system memory queue 506. System memory queue 506 functions as a first-in first-out (FIFO) buffer. The input value to system memory queue 506 is also received by a buffer 508 which multiplies it by a constant value −K. The output of buffer 508 is added to the output of system memory queue 506 by a summer 510. The output of summer 510 is multiplied by a constant value G by a buffer 512. The output of buffer 512 is the output of X delay element 500.

Figure 6:
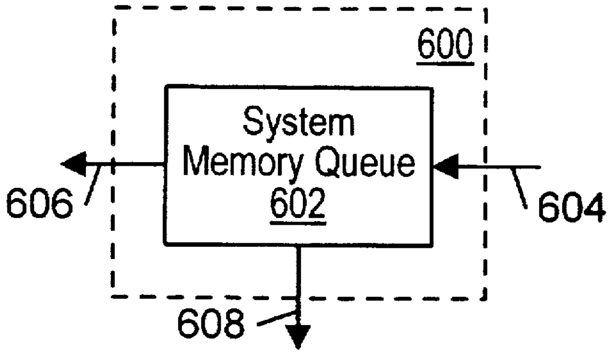
FIGS. 6 and 7 are signal flow diagrams illustrating the operation of delay elements in FIG. 5.

Turning now to FIG. 6, a signal flow diagram is provided to illustrate the operation of a Y delay element 600. The intent of a Y delay element is to create a phase difference between left and right audio outputs to create a stereo effect. Y delay element 600 comprises a system memory queue 602 which functions as a pair of FIFO buffers with the output of the first coupled to the input of the second. The output of the first FIFO appears as Y delay element output 608, and the output of the second FIFO appears as Y delay element output 606. The input 604 to Y delay element 600 is coupled to system memory queue 600 where it serves as the input to the first FIFO buffer.

In FIG. 7 a signal flow diagram for reverb, a delay-based sound effect, is provided. The current sample contents of at least one of effects accumulators 214 and DAC accumulator 212 are combined in the manner shown. In this figure it is assumed that DAC accumulator will have a left and right audio sample. The contents of effects accumulator 214 is passed through a series of five X delay elements 702, 704, 706, 708, and 710. This creates an echoed sample sequence that represents an enormous multiplicity of echoes. The sample sequence then enters an outer feedback loop at summer 732. A feedback sequence is added to the sample sequence by summer 732. The output sample sequence from summer 732 is multiplied by a constant value W by buffer 734. The sample sequence then enters an exponential decay feedback loop comprised of a summer 736, a unit delay element 738, and a multiplier buffer 740. The exponential decay feedback loop has an exponentially decaying impulse response which effectively "smears" the echoes in a manner consistent with an acoustic reflection from an infinite planar surface. The output of the exponential decay feedback loop is provided by the output of summer 736. This output sample sequence enters an alternating series of Y and X delay elements 722, 716, 720, 714, 718, and 712. X delay elements 716, 714, and 712 function to re-echo the smeared multiplicity of echoes already present in the sample sequence. Y delay elements 722, 720, and 718 function to provide output signals with different delays to a pair of summers 724 and 726. Summer 724 sums the second output from Y delay element 722, the first output from Y delay element 720, the second output from Y delay element 718, and the contents of the left DAC accumulator to form a left output signal sequence. Similarly, summer 726 sums the first output of Y delay element 722, the second output of Y delay element 720, the first output of Y delay element 718, and the contents of the right DAC accumulator to form a right output signal sequence. The left and right output signal sequences are each multiplied by a constant value H by buffers 728 and 730, respectively. The outer feedback loop is closed by coupling the output of X delay element 712 as the feedback sequence to summer 732. The outer feedback loop has the effect of continually re-echoing progressively more smeared versions of the echoed sample sequence.

Figure 8:
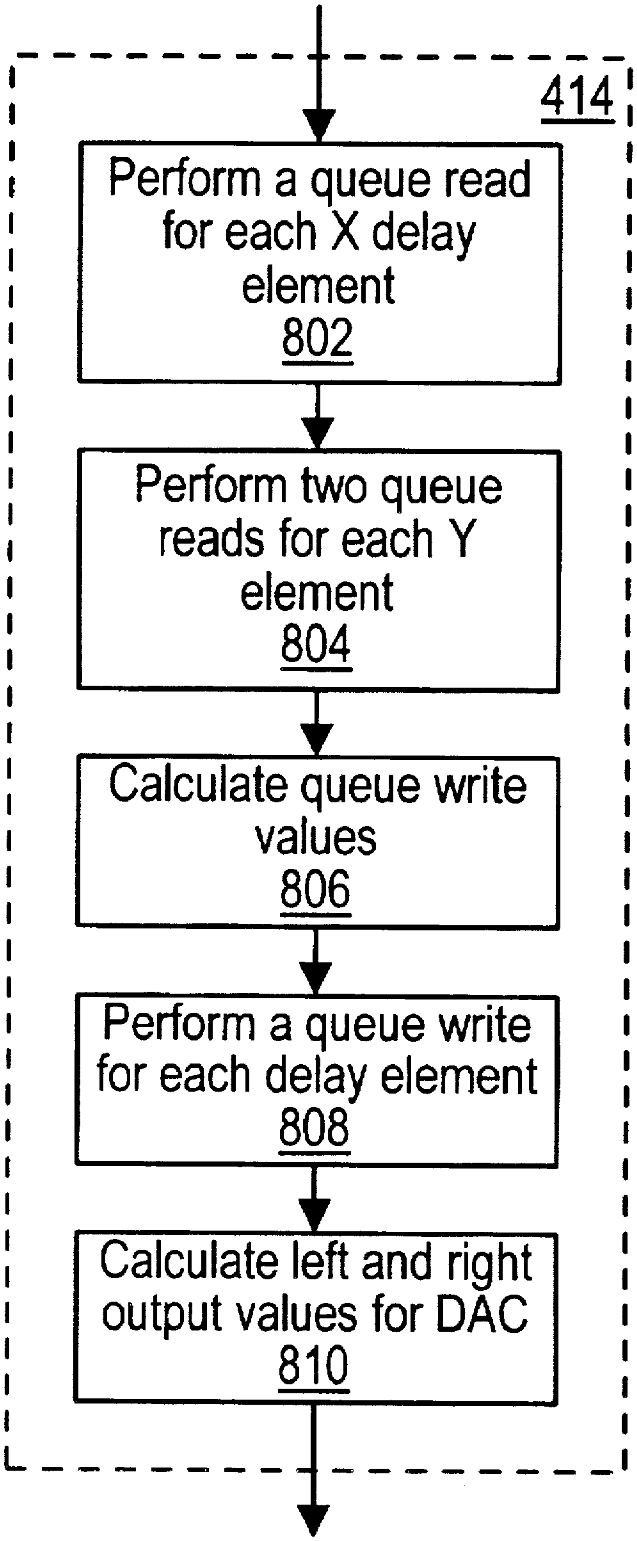
FIG. 8 is a flowchart illustrating the steps for implementing a delay-based special effect.

In FIG. 8, a flowchart is shown illustrating the sub-steps involved in performing step 414. To perform the algorithm for the reverb special effect, the DSP executes a step 802 in which the output sample values of the system memory queues for X delay elements 702 through 716 are read. The DSP then performs step 804 in which the output sample values of the system memory queues for Y delay elements 718, 720, and 722 are read. Next, in step 806, the DSP calculates the input sample values for the system memory queues for all of the delay elements, according to the signal flow diagrams in FIGS. 5, 6, and 7. The DSP then writes the input sample values to the system memory queues in step 808. The DSP then performs step 810 in which the output sample values are determined for DAC 206.

It should be noted that the queue reads and writes described above are performed via read and write buffers controlled by buffer manager 210. During normal operation, the DSP of the audio device requests time-delay data samples from the buffer manager of the audio device in step 414. After the DSP requests samples for a current system memory queue, the buffer manager determines whether or not the requested samples reside in the plurality of buffers of the audio device. If the buffer manager determines that the samples do reside in the buffers then the buffer manager passes the samples on to the DSP. Otherwise, if the buffer manager determines that the samples do not reside in the buffers the buffer manager flushes the buffer associated with the current system memory queue and afterwards generates a high priority fill request to the I/O bus interface of the audio device.

After the buffer manager passes the samples on to the DSP, the buffer manager conditionally updates the highest sample pointer for the buffer associated with the current system memory queue to reflect the fact that the samples were passed to the DSP. After the buffer manager updates the highest sample pointer the buffer manager determines if the updated highest sample pointer points to the generate fill request location in the buffer associated with the current delay element. If the buffer manager determines that the highest sample pointer in fact points to the generate fill request location, the buffer manager generates a normal fill request to the I/O bus interface.

After the buffer manager generates a normal fill request to the I/O bus interface the I/O bus interface arbitrates for the I/O bus and obtains bus mastership of the I/O bus. After the I/O bus interface obtains mastership of the I/O bus the buffer manager fills the active buffers with the appropriate time-delay data samples from the system memory queue. As previously discussed, this prefetching, in anticipation of sequential requests from the DSP address generator, advantageously avoids I/O bus latencies associated with fetching the samples from system memory.

Recall that the buffer manager generates a high priority fill request to the I/O bus interface as the result of having determined that the samples requested by the DSP do not reside in the buffers. After the buffer manager generates a high priority fill request to the I/O bus interface the I/O bus interface generates a high priority I/O bus request, the I/O bus interface obtains bus mastership of the I/O bus. After the I/O bus interface obtains mastership of the I/O bus the buffer manager fills the buffer associated with the high priority fill request with the appropriate time-delay data samples from the system memory queue. As previously discussed, if the I/O bus interface is unable to obtain ownership of the I/O bus and the samples requested by the DSP cannot be transferred from system memory to the DSP within a frame time due long I/O bus latencies then the DSP must output a surrogate value. This results in loss of audio fidelity. Hence, the preferred embodiment of the present invention fills buffers associated with high priority fill requests before normal fill requests. An additional consideration is that a normal fill request may not be able to be completed in a single bus mastership. Therefore, the preferred embodiment of the present invention performs high priority fill requests before normal priority fill requests.

The plurality of buffers 208 will also include write back buffers. The write-back buffers are similar to the buffer shown in FIG. 3. Buffer manager 210 maintains a highest sample pointer for each write-back buffer which points to the next empty entry in the write-back buffer. Each time the DSP writes a sample into the write-back buffer, the buffer manager 210 updates the highest sample pointer to point to the next empty entry. When highest sample pointer points to a predetermined generate write-back request location, the buffer manager 210 asserts a write-back request signal, i.e., generates a write-back request. In the preferred embodiment, the generate write-back request location is where 2 empty entries remain in the write-back buffer. It is noted that various depths of the write-back buffers and generate write-back request location may be realized and in describing the embodiment shown it is not the intention to preclude any such other variations.

During normal operation, the DSP of the audio device requests time-delay data samples from the buffer manager of the audio device for a current system memory queue. After the DSP requests samples, the buffer manager retrieves the time-delay data samples from a first location in system memory and provides the samples to the DSP. After the buffer manager retrieves the samples and provides them to the DSP, the DSP provides the samples to one of the plurality of write-back buffers associated with the current system memory queue. After the DSP provides the samples to the write-back buffers, the buffer manager writes back the samples to a second location in system memory.

In a vertical cache embodiment, DSP 204 operates to process a batch of 32 frames at a time. Rather than generate one frame at a time as described previously, DSP 204 generates an audio sample for each of 32 frames, then scales the samples to create 32 consecutive input samples for the special effects algorithm. The special effects algorithm is then executed by processing the 32 samples through one delay element at a time. This approach allows the use of a three buffers 208. When the DSP is iterating through the effects algorithm, it operates on output samples for the current delay element which have been cached into one buffer, and caches write-back samples for the current delay element into a second buffer. Meanwhile, the buffer manager 210 writes back 32 input samples for the previous delay element to memory from a third buffer, and refills it with 32 prefetched samples for the next delay element. This is another fashion in which I/O bus latencies associated with fetching the samples from system memory may be avoided.

Numerous variations and modifications will become apparent to those skilled in the art once the above disclosure is fully appreciated. It is intended that the following claims be interpreted to embrace all such variations and modifications.

What is claimed is:

1. A computer system capable of performing sound synthesis comprising:

an I/O bus for transferring data;

a system memory coupled to said I/O bus for storing data, wherein the system memory stores time delay data used in creating delay-based special effects;

a CPU coupled to said memory for storing program instructions and data whereby the computer system may be configured to perform a variety of tasks;

a system audio device comprising:

an I/O bus interface coupled to said I/O bus;

a DSP coupled to said I/O bus interface and configured to algorithmically generate an audio signal with a delay-based special effect, wherein the DSP accesses said time delay data from said system memory and uses said time delay data in generating said audio signal with said delay-based special effect.

2. The computer system as recited in claim 1, wherein said system audio device further comprises:

a read buffer coupled to said I/O bus interface for buffering said time-delay data stream from said system memory; and a buffer manager coupled to said I/O bus interface, said DSP, and said read buffer, for managing transfers of a plurality of time-delay data samples from said system memory to said read buffer; wherein said time-delay data samples are transferred from said read buffer to said DSP in response to control signals from said DSP for said time-delay data samples.

3. The computer system as recited in claim 2, wherein said delay-based special effect has an algorithmic implementation using a number of time-delay elements to store queues of time-delay data samples, and wherein said system audio device comprises a number of read buffers corresponding to said number of time-delay elements.

4. The computer system as recited in claim 2, wherein said buffer manager generates a normal fill signal to said I/O bus interface for requesting said I/O bus interface to generate a normal priority I/O bus mastership, and said buffer manager generates a high priority fill signal to said I/O bus interface for requesting said I/O interface to generate a high priority I/O bus mastership.

5. The computer system as recited in claim 2, wherein said buffer manager generates a data unavailable signal, indicating that a requested plurality of time-delay data samples does not reside in said read buffer, and said buffer manager is unable to retrieve said requested plurality of time-delay data samples from said system memory into said read buffers within a desired frame time latency; and wherein said DSP outputs its last calculated value in response to an assertion of said data unavailable signal until said requested plurality of time-delay data samples becomes available.

6. The computer system as recited in claim 2, wherein said buffer manager further maintains a highest sample pointer for said read buffer which points to a highest sample in said read buffer, wherein said buffer manager determines if said sample pointer points to a generate fill request location, wherein said generate fill request location indicates that said read buffer is a predetermined amount empty, wherein said buffer manager refills said read buffer if said highest sample pointer points to said generate fill request location.

7. The computer system as recited in claim 2 wherein said system audio device further comprises a write-back buffer coupled to said I/O bus interface, wherein said DSP reads a plurality of time-delay data samples from a first location in said system memory through said read buffer and writes a plurality of time-delay data samples back to a second location in said system memory through said write-back buffer.

8. The computer system as recited in claim 1 wherein said I/O bus is the PCI bus.

9. A method of performing sound synthesis with a delay-based special effect in a system comprising a system memory storing time-delay data samples, an I/O bus, and a system audio device, said system audio device having an I/O bus interface, a DSP, a read buffer, and a buffer manager, comprising:

storing time-delay data samples in the system memory;

said DSP requesting a plurality of time-delay data samples;

said buffer manager determining if said plurality of time-delay data samples reside in said read buffer after said DSP requesting samples;

said buffer manager passing said time-delay data samples from said read buffer to said DSP if said buffer manager determines said time-delay data samples reside in said read buffer; and said buffer manager retrieving said time-delay data samples from said system memory and providing said time-delay data samples to said DSP if said buffer manager determines said samples do not reside in said read buffer.

10. The method of claim 9 further comprising:

said buffer manager updating a highest sample pointer associated with said read buffer after said buffer manager passing said time-delay data samples;

said buffer manager determining if said highest sample pointer points to a generate fill request location after said buffer manager updating;

said buffer manager generating a fill request to said I/O interface if said buffer manager determines said highest sample pointer points to a generate fill request location.

11. The method of claim 10 further comprising:

said I/O interface obtaining I/O bus mastership after said buffer manager generating a fill request to said I/O interface;

said buffer manager filling from said system memory said read buffer after said I/O interface obtaining I/O bus mastership.

12. The method of claim 9 wherein said delay-based special effect has an algorithmic implementation using a number of time-delay elements to store queues of time-delay data samples, and wherein said DSP performs said DSP requesting, and said buffer manager performs said buffer manager determining, said buffer manager passing and said buffer manager retrieving for each time-delay element in a current frame time.

13. A computer system capable of performing sound synthesis comprising:

an I/O bus for transferring data;

a system memory coupled to said I/O bus for storing data, wherein the system memory stores time delay data used in creating delay-based special effects;

a CPU coupled to said memory for storing program instructions and data whereby the computer system may be configured to perform a variety of tasks;

a system audio device comprising:

an I/O bus interface coupled to said I/O bus;

a DSP coupled to said I/O bus interface and configured to algorithmically generate an audio signal with a delay-based special effect, wherein the DSP accesses said time delay data from said system memory and uses said time delay data in generating said audio signal with said delay-based special effect;

a number of buffers coupled to said I/O bus interface for buffering said time-delay data stream to and from said system memory, wherein said number of buffers is three; and a buffer manager coupled to said I/O bus interface, said DSP, and said buffers, for managing transfers of a plurality of time-delay data samples between said system memory and said buffers, wherein time-delay data samples from said system memory are transferred from said buffers to said DSP in response-to control signals from said DSP for said time-delay data samples, wherein said DSP writes new time-delay data samples to said buffers for transference to system memory.

14. The computer system as recited in claim 13, wherein said buffer manager generates a normal fill signal to said I/O bus interface for requesting said I/O bus interface to generate a normal priority I/O bus mastership, and said buffer manager generates a high priority fill signal to said I/O bus interface for requesting said I/O interface to generate a high priority I/O bus mastership.

15. The computer system as recited in claim 13, wherein said buffer manager generates a data unavailable signal, indicating that a requested plurality of time-delay data samples does not reside in said read buffer, and said buffer manager is unable to retrieve said requested plurality of time-delay data samples from said system memory into said read buffers within a desired frame time latency; and wherein said DSP outputs its last calculated value in response to an assertion of said data unavailable signal until said requested plurality of time-delay data samples becomes available.

16. The computer system as recited in claim 13 wherein said I/O bus is the PCI bus.

17. A computer system capable of performing sound synthesis comprising:

an I/O bus for transferring data;

a system memory coupled to said I/O bus for storing data, wherein the system memory stores time delay data used in creating delay-based special effects;

a CPU coupled to said memory for storing program instructions and data whereby the computer system may be configured to perform a variety of tasks;

a system audio device comprising:

an I/O bus interface coupled to said I/O bus;

a DSP coupled to said I/O bus interface and configured to algorithmically generate an audio signal with a delay-based special effect, wherein the DSP accesses said time delay data from said system memory and uses said time delay data in generating said audio signal with said delay-based special effect;

a number of buffers coupled to said I/O bus interface for buffering said time-delay data stream to and from said system memory, wherein said number of buffers is three; and a buffer manager coupled to said I/O bus interface, said DSP, and said buffers, for managing transfers of a plurality of time-delay data samples between said system memory and said buffers, wherein time-delay data samples from said system memory are transferred from said buffers to said DSP in response to control signals from said DSP for said time-delay data samples, wherein said DSP writes new time-delay data samples to said buffers for transference to system memory, wherein said buffer manager further maintains a first of said buffers for receiving said new time-delay data samples from said DSP, a second of said buffers for transferring time-delay data samples to said DSP, and a third of said buffers for transferring time-delay data samples to and from said system memory, wherein said buffer manager determines a new role for each buffer when said first buffer is full, said second buffer assuming the role of the first buffer, said third buffer assuming the role of the second buffer, and said first buffer assuming the role of the third buffer, wherein after said first buffer is full said buffer manager transfers said new time-delay data samples from said first buffer to said system memory and refills said first buffer with time-delay data samples from said system memory.

18. The computer system as recited in claim 17, wherein said DSP uses a number of time-delay elements to store queues of time-delay data samples, and wherein said number of buffers corresponds to at least said number of time-delay elements.

19. The computer system as recited in claim 17, wherein said buffer manager further maintains a highest sample pointer for one of said number of buffers which points to a highest sample in said one of said number of buffers, wherein said buffer manager determines if said sample pointer points to a generate fill request location, wherein said generate fill request location indicates that said one of said number of buffers is a predetermined amount empty, wherein said buffer manager refills said one of said number of buffers if said highest sample pointer points to said generate fill request location.

20. The computer system as recited in claim 17, wherein said system audio device further comprises a write-back buffer coupled to said I/O bus interface, wherein said DSP reads a plurality of time-delay data samples from a first location in said system memory through one of said number of buffers and writes a plurality of time-delay data samples back to a second location in said system memory through said write-back buffer.

* * * * *